(12) United States Patent
Cuavas et al.

(10) Patent No.: US 12,672,007 B2
(45) Date of Patent: Jun. 30, 2026

(54) RU/DU SETUP AND CHAINING IN O-RAN

(71) Applicant: DISH Wireless L.L.C., Littleton, CO (US)

(72) Inventors: Orlando Cuavas, Littleton, CO (US); Prakash Srinivasan, Highlands Ranch, CO (US)

(73) Assignee: DISH Wireless L.L.C., Littleton, CO (US)

( * ) Notice: Subject to any disclaimer, the term of this patent is extended or adjusted under 35 U.S.C. 154(b) by 346 days.

(21) Appl. No.: 18/468,518

(22) Filed: Sep. 15, 2023

(65) Prior Publication Data

US 2025/0097720 A1 Mar. 20, 2025

(51) Int. Cl.
H04W 92/12 (2009.01)
H04W 16/18 (2009.01)
(52) U.S. Cl.
CPC ............ H04W 16/18 (2013.01); H04W 92/12 (2013.01)

(58) Field of Classification Search
CPC .................................................... H04W 16/18
See application file for complete search history.

(56) References Cited

U.S. PATENT DOCUMENTS

2022/0417876 A1* 12/2022 Ranson .................. H04B 7/022
2024/0314619 A1* 9/2024 Paterra .............. H04W 28/0226

* cited by examiner

*Primary Examiner* — Michael T Vu
(74) *Attorney, Agent, or Firm* — Kilpatrick Townsend & Stockton LLP

(57) ABSTRACT

Various embodiments provide RU/DU/CU chaining in an O-RAN by ZTP operations automatically. The chaining creates a logical gNB for achieving flexibility in the O-RAN. In some embodiments, one or more RUs are chained to a DU in a cell site when the DU is initiated in the O-RAN. In those embodiments, a network management system is employed to store and manage O-RAN configurations to facilitate the RU/DU/CU chaining. In some embodiments, the cell site is customized during the chaining process.

16 Claims, 7 Drawing Sheets

1

RU/DU SETUP AND CHAINING IN O-RAN

BACKGROUND OF THE INVENTION

Zero-touch provisioning (ZTP) is a method of setting up devices that automatically configures the device using a switch feature. ZTP helps IT teams quickly deploy network devices in a large-scale environment, eliminating most of the manual labor involved with adding them to a network.

ZTP can be found in devices and tools such as network switches, routers, wireless access points and firewalls. The goal is to enable IT personnel and network operators to install networking devices without manual intervention. Manual configuration takes time and is prone to human error—especially if many devices must be configured at scale. ZTP is faster in this case, reduces the chance of error and ensures configuration consistency.

Zero-touch provisioning is also used to automate the system updating process. Using scripts, ZTP connects configuration management platforms and other tools for configuration or updates.

An Open RAN, or Open Radio Access Network is a concept based on interoperability and standardization of RAN elements including a unified interconnection standard for white-box hardware and open source software elements from different vendors. Open RAN architecture integrates a modular base station software stack on off-the-shelf hardware which allows baseband and radio unit components from different suppliers to operate seamlessly together.

BRIEF SUMMARY OF THE INVENTION

Previous RAN architectures (for example, 2G, 3G and 4G) were based on a "monolithic" building blocks, where few interactions happened between logical nodes. In O-RAN 5G, splitting up the gNB (the NR logical node) between Central Units (CUs) and Distributed Units (DUs) brings flexibility to hardware and software implementations, allowing scalable, cost-effective network deployments. A split architecture (between central and distributed units) allows for coordination for performance features, load management, real-time performance optimization and enables adaptation to various use cases and the QoS that needs to be supported (i.e. gaming, voice, video), which have variable latency tolerance and dependency on transport and different deployment scenarios, like rural or urban, that have different access to transport like fiber.

Various embodiments provide RU/DU/CU chaining in an O-RAN by ZTP operations. The chaining creates a logical gNB for achieving the aforementioned flexibility. In some embodiments, one or more RUs are chained to a DU in a cell site when the DU is initiated in the O-RAN. In those embodiments, a network management system is employed to store and manage O-RAN configurations to facilitate the RU/DU/CU chaining. In some embodiments, the cell site is customized during the chaining process.

In some embodiments, a method is provided for chaining a RU, a DU and a CU in an O-RAN automatically. In those embodiments, the method comprises: detecting a distribution unit (DU) is instantiated in the O-RAN; obtaining chaining information for the DU, the chaining information indicating a chaining between the DU and at least one radio unit (RU); resetting the at least one RU; chaining the DU with the at least one RU to form a radio access network (RAN) for a cell site; detecting the CU is instantiated and obtaining information indicating the CU is to be chained with the DU; and chaining the DU with the CU such that the chained RU, DU, and CU form a gNb. Other embodiments are contemplated.

DETAILED DESCRIPTION OF THE INVENTION

Figure 1:
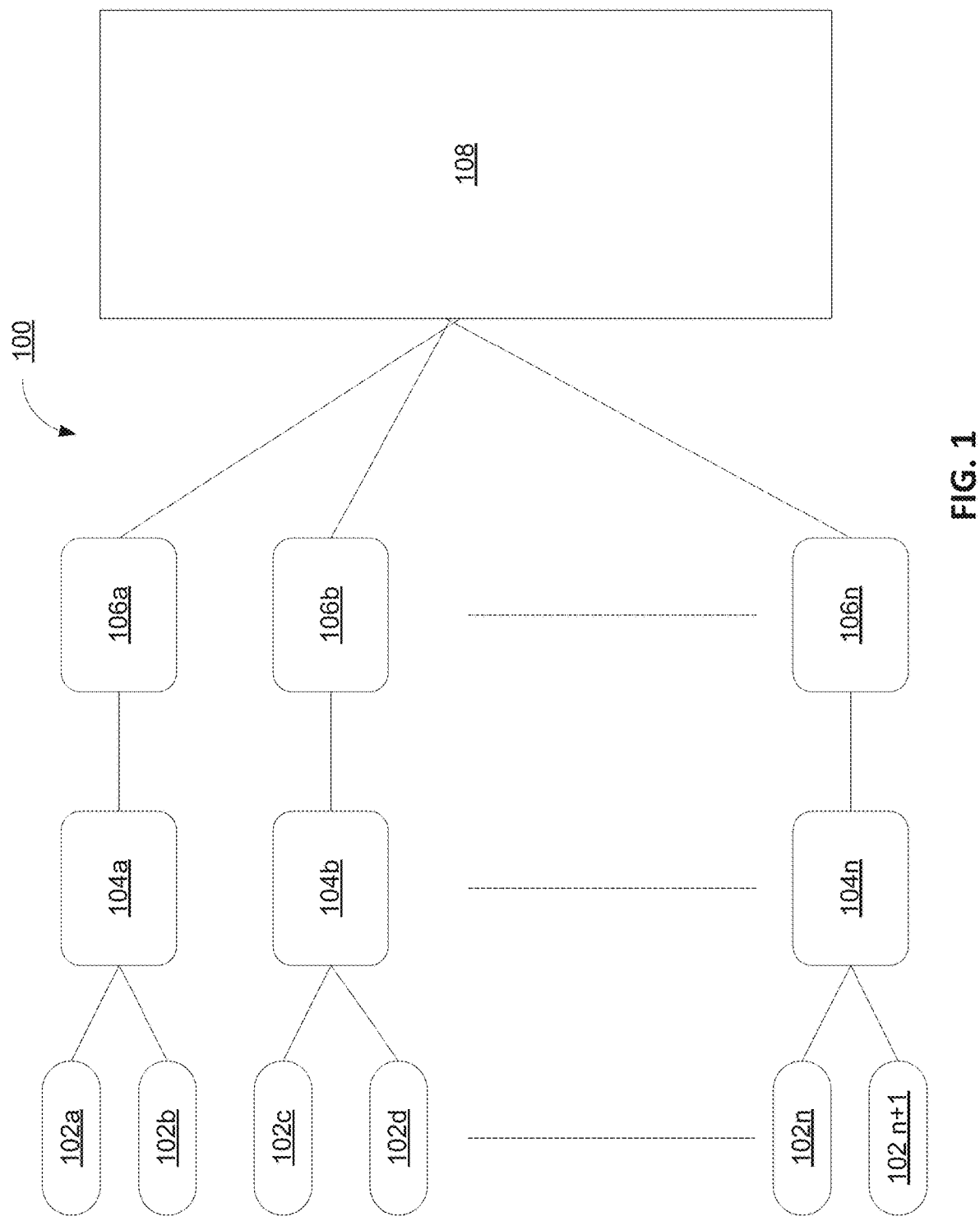
FIG. 1 illustrates an example system architecture of an O-RAN in which validation for ZTP operations are implemented in accordance with the present disclosure.

One of the key benefits of Open RAN is how it powers innovation, and automation is a driver of this innovation. Cloud-native automation tools such as Continuous Integration/Continuous Delivery (CI/CD), Zero-Touch Provisioning (ZTP), Cloud Automation, Artificial Intelligence (AI) and Machine Learning (ML) enable the creation of agile, flexible, elastic, and efficient applications in modern, dynamic Open RAN environments. When automation becomes a key feature of an ALL G Open RAN solution, Mobile Network Operators (MNOs) reap the benefits of not only flexibility of choice and cost savings, but also the agility, scalability, ease of management and upgradeability that comes with the promise of a cloud-native Open RAN solution.

It should be understood ZTP used in the present disclosure is not meant to exclude operations that would still need more or less human intervention. It is understood that not all ZTP operations necessarily are automatic. In various examples, ZTP operations may include operations that need human intervention. In those examples, such operations may be understood as low touch provisioning (LTP). As used herein, the term ZTP may include LTP.

Automated Orchestration and management is key to benefit from a cloud-native Open RAN solution. Automation with modern tools and technologies can provide several advantages and help at different stages of network deployment, from preparation to rollout of a new network or service, then operating and monitoring the network after roll-out. Automation is also important when it comes to termination or scaling down the network.

One insight provided by the present disclosure is a ZTP workflow that automatically configures an O-RAN network, e.g., a 5G O-RAN network. The ZTP workflow involves various stages setting up servers in a core network of the O-RAN and as well as devices in individual cell sites facilitating the O-RAN. In various examples, the ZTP workflow comprises computer host provisioning (CHP), v-center provisioning (VCP), node-pool creation (NPC), distribution unit instantiation (DUI), radio access network (RAN) initiation, and/or any other stages.

In various examples, a ZTP orchestrator (ZTPO) is employed to complete one or more aforementioned stages in the ZTP workflow. In those embodiments, the ZTPO kicks off the stages in a predetermined sequence. In this sequence, in an earlier stage the ZTP sets up infrastructure in the O-RAN that facilitates a later stage setup. This is akin to setting up core functions/devices in the core network, such as IP assignment capability in the core network, and then moving on to setting up individual cell sites. One advantage of this workflow lies in its scalability to incorporate a variety of vendors into the O-RAN. This workflow can be maintained by an operator/provider of the O-RAN—as opposed to having the vendors develop their own ZTP routines to bring their devices into the O-RAN.

Example O-RAN

With one or more novelties provided by the present disclosure having been generally described, an example O-RAN is provided in this section. The example O-RAN is for illustrating a context where a ZTP workflow in accordance with the present disclosure can be employed.

Open radio access network ("O-RAN" herein) is a standard that allows a telecommunications network with all its functions, except necessary hardware components facilitating radio access, to be implemented in a cloud with automated deployment and operations. FIG. 1 generally illustrates an example system architecture of an O-RAN in which validation for ZTP operations are implemented in accordance with the present disclosure. It should be understood that the example system architecture shown in FIG. 1 is not particularly limited to a type of network—such as 4G or 5G. Although, some embodiments in the present disclosure are described and illustrated in the context of 5G, the example system architecture shown in FIG. 1 is intended to show a general environment in which technologies in accordance with the present disclosure can be applied. One skilled in the art will understand how to apply the technologies in accordance with the present disclosure to a network environment described by the example system architecture shown in FIG. 1.

As shown in FIG. 1, the example system architecture 100 of an O-RAN in accordance with the present disclosure comprises multiple cell sites, such as cell sites 102a, b, c, d, . . . , n, n+1. As illustrated in this example, within a given cell site, such as 102a, one or more radio units (RU) are installed in the O-RAN in accordance with the present disclosure. A given one of the RUs in the given cell site comprises hardware components such as radio frequency (RF) transceivers, antennas configured to transmit and receive RF signals from/to end user equipment (UE), such as smartphones. In various implementations, RUs in different cell sites in the example system architecture 100 can be provided by different hardware vendors. It is contemplated that in some embodiments, the cell sites in the example system architecture 100 are heterogenous in terms of hardware they are implemented in.

Also shown in FIG. 1 are distributed units (DUs) 104a, 104b . . . and 104n. A given one of the DUs, such as 104a in this example, is configured to facilitate real-time baseband processing function. Various protocols can be configured into the given DU, such as RLC, PDCP MAC and/or any other lower-level protocols. In various implementations, the given DU is configured to communicate with at least one RU in a cell site. For example, as shown in this example, the DU 104a is configured to communicate with the RUs in cell sites 102a and 102b, the DU 104b is configured to communicate with the RUs in cell sites 102c and 102d, and DU 104n is configured to communicated with the RUs in cell sites in 102n and 102n+1. It should be understood that the communications illustrated between the DUs and the cell sites in FIG. 1 are merely illustrative and thus should not be understood as limiting a scope of the O-RAN in accordance with the present disclosure. That is, the O-RAN in accordance with the present disclosure is not limited to one DU connected only to two cell sites as illustrated in FIG. 1. One skilled in the art understands that the O-RAN in accordance with the present disclosure can comprise a DU configured to however many cell sites.

A given communication link between a given DU and given RU in a cell site is typically referred to as a fronthaul haul—for example, the links between cell sites 102a/b and DU 104a. In that example, the DU 104a is configured to consolidate and process inbound traffic from RUs in the cell sites 102a/b, distributes traffic to the RUs in the cell sites 102a/b. In implementations, the DUs can be located near the cell sites they have communication with or centralized in a local data center provided by a vendor. In some implementations, various functionalities in the DUs can be implemented using software.

Still shown in FIG. 1 are centralized units (CUs), such as CU 106a, 106b, and 106n. A given one of the CUs is configured to handle higher layers of communication protocols as compared to a DU. For example, less time-sensitive packet processing, such as SDAP, RRC or PDCP, may be implemented in the given CU. It should be understood that functionality split between CU and DU is not intended to be specifically limited in the present disclosure. It is understood that such a split can be a design choice for a particular O-RAN. That is, the present disclosure should not be understood as being limited to a specific version or specific versions of O-RAN, where splits between CU and DU are specifically defined. For example, the DU can be co-located with the CU, or the DU can be bundled with the RU. The DU can also run standalone. Collectively, RUs, DUs, and a CU can create a gNodeB, which serves as a radio access network (RAN) of example system architecture 100.

In implementations, CUs in an O-RAN in accordance with the present disclosure can be implemented using software. In some embodiments, the given CU may be located in a data center provided by a third party vendor. In some embodiments, one or more of the given CU can be located in the data center. The individual links between a CU and DU is typically referred to as a midhual link, for example the link between 104a and 106a shown in this example.

FIG. 1 also shows a core network 108. The core network 108 is configured to enable end users to access services such as phone calls, internet, etc. In various embodiments, the core network 108 is configured to handle operations such as subscriber location, profile, authentication, and/or any other operations. In those embodiments, such operations can facilitate the end users to employ communication technologies (such as 5G) through the example system architecture 100. In some embodiments, the services and/or operations provided by the core network 108 are implemented using software. Although only one core network 108 is shown in FIG. 1, this is not intended to be limiting. It should be understood the example system architecture 100 is not intended to be limited to 5G. It is understood embodiments provided herein can be applied to other types of cell sites when appropriate, such as LTE, 3G, 6G, WIFI or any other types of networks.

In various other examples, more than one core network 108 can be included in the O-RAN in accordance with the present disclosure. Links between a CU and the core network 108 are typically referred to as backhaul links, for example, the link between CU 106a and core network 108 shown in this example. The fronthaul links, midhaul links, and backhaul links shown in FIG. 1 may be collectively referred to as a transport layer for the example system architecture 100. In various embodiments, the transport layer is configured to handle end-to-end communication over the O-RAN in accordance with the present disclosure.

Figure 2:
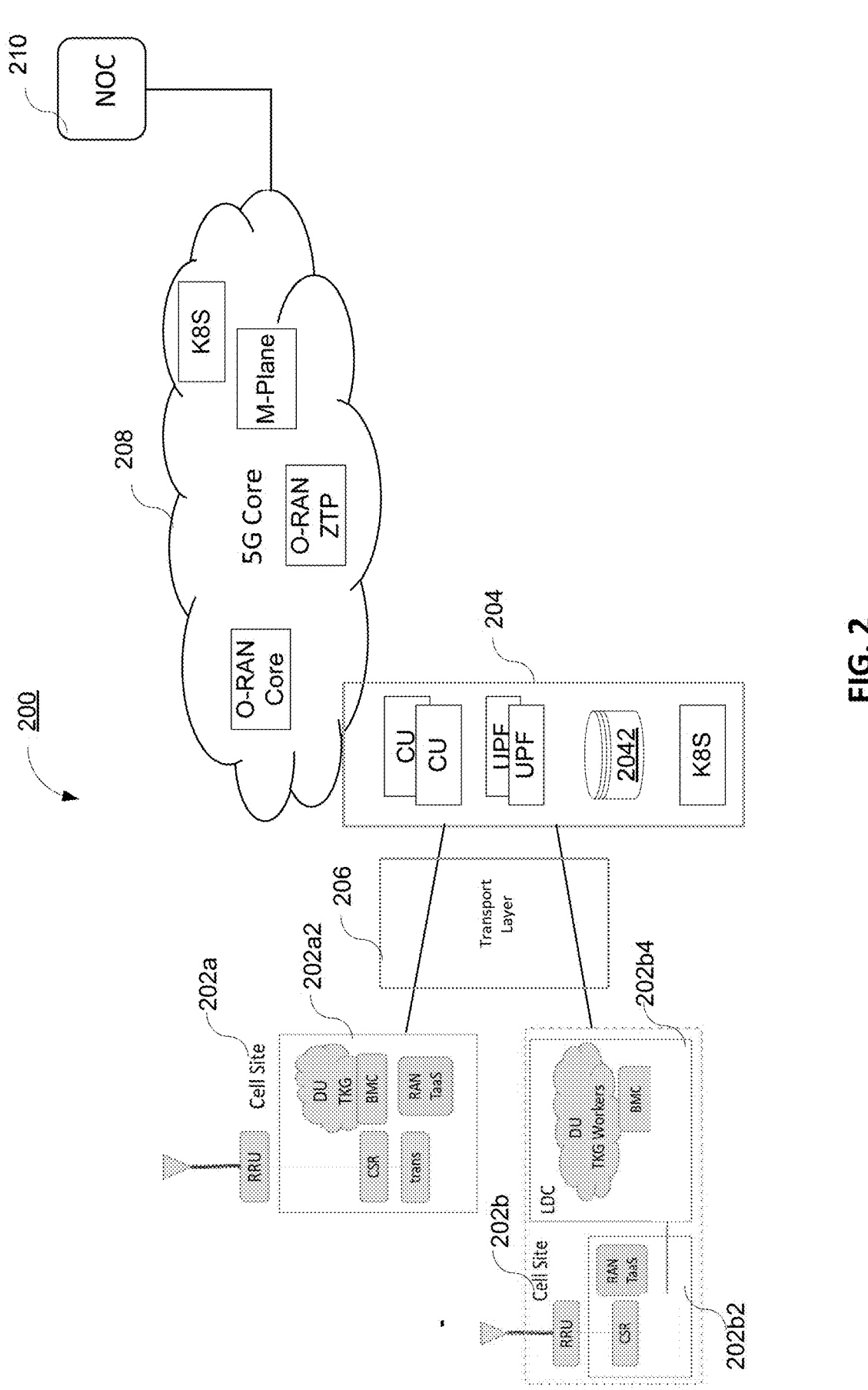
FIG. 2 illustrates an example system architecture of a 5G O-RAN implement in a cloud.

With an example system architecture 100 of O-RAN in accordance with the present disclosure having been generally described and illustrated, attention is now directed to FIG. 2, where an example system architecture 200 of a 5G O-RAN implement in a cloud is generally illustrated.

Example System Architecture of 5G O-RAN

As shown FIG. 2, the example system architecture 200 of a 5G O-RAN comprises a cell site 202a, a cell site 202b, and/or any other cell site(s). As shown, each of the cell site 202a, and 202b, in this example, includes a remote radio unit (RRU). In this example, one or more computing devices, located outside the cell site 202a, are configured to implement a cell site router (CSR), a DU, a baseband management controller (BMC), a RAN TaaS (test as a service), and/or any other components. In some embodiments, the computing device includes a processor configured to implement various components mentioned above. In one embodiment, the computing device(s) 202a2 includes an operating system such as a Linux system to implement these components. In that embodiment, the computing device(s) 202a2 is located in a cabinet within a proximity of the cell site 202a. In that embodiment, the cell site 202a is referred to as a "lite site".

The cell site 202b includes a computing device 202b2 and another computing device 202b4. In this example, the computing devices 202b2 and 202b4 are located within the cell site 202b. In one embodiment, the computing devices 202b2 and 202b4 are located in a cabinet within the cell site 202b. In that embodiment, the cell site 202b is referred to as a "dark site".

Figure 4:
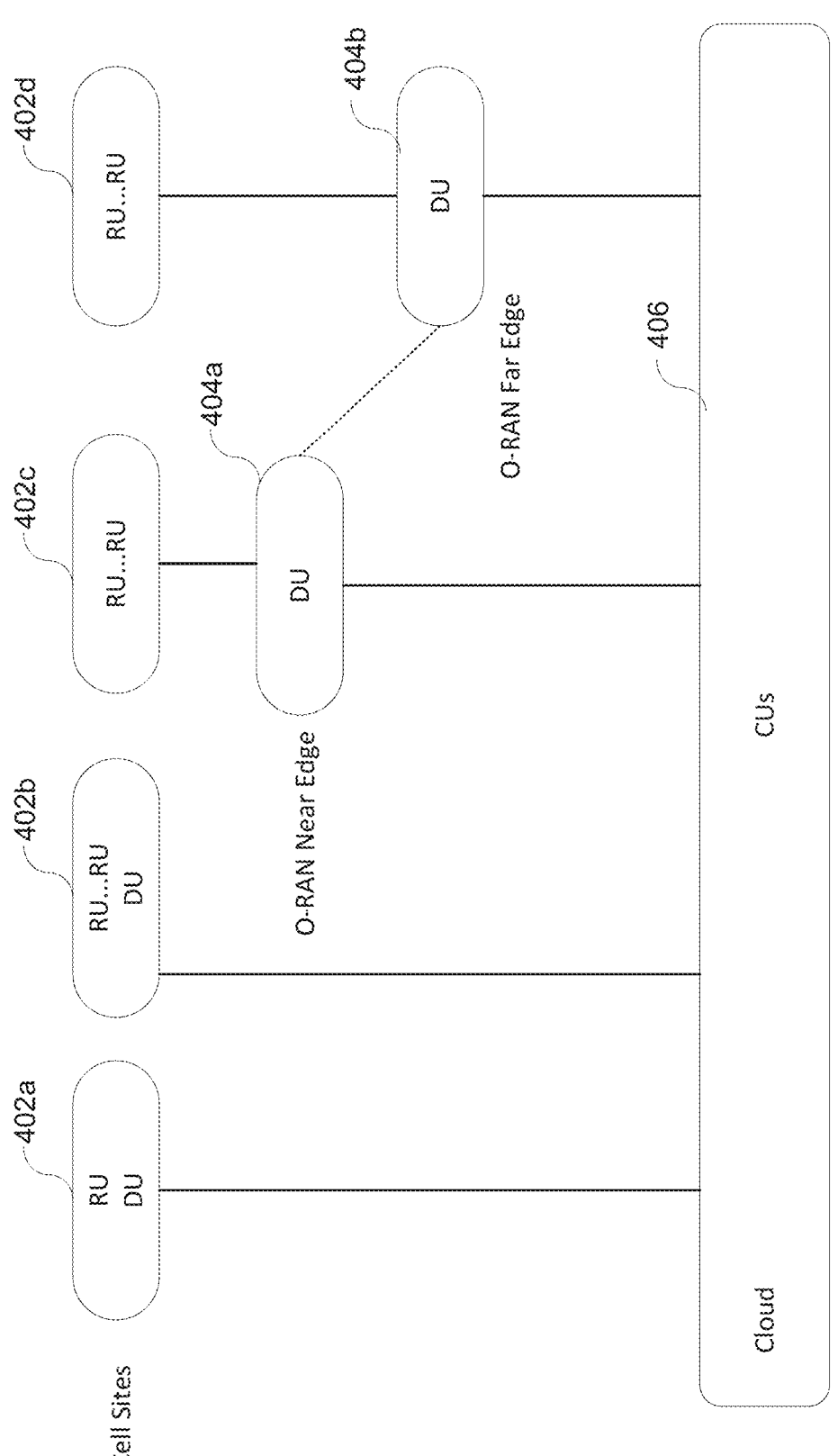
FIG. 4 illustrates various examples of RU/DU/CU chaining in an O-RAN in accordance with the present disclosure.

As shown, in this example, the computing device 202b2 is configured to implement the CSR, RAN TaaS, and/or any other components, while the computing device 202b4 is configured to implement the DU (for example, hosting Tanzu Kubernetes Grid (TKG)), BMC, and/or any other components. This is to show cell sites in a 5G O-RAN in accordance with the present disclosure can have computing devices located within the cell sites and configured to implement various components whose functionalities attributed to the DU, CSR or RAN TaaS. That is, the 5G O-RAN in accordance with the present disclosure is not intended to be limited such that DU and CSR/RAN TaaS are implemented on different computing devices, and/or outside the cell site. In some embodiments, the RAN TaaS for a specific cell site such as 202a or 202b can include tests designed to components and functionalities within the specific cell site, functionalities with another cell site (e.g., adjacency testing), and/or end-to tend testing. FIG. 4 illustrates various examples of RUs and DUs chaining within the same cell site or across cell sites.

In various embodiments, the RAN TaaS shown in this example is implemented using software and is configured to test and ensure one or more O-RAN components—e.g., the RRU or CSR, in the cell sites are performing in compliance with O-RAN standards. Various tests or test suites can be configured into RAN TaaS to cause target components in the cell sites to be run under preset test conditions. A goal of such a test or test suite in the RAN TaaS is to verify that individual components in the cell sites can handle expected traffic and functionality. In some embodiments, tests in the RAN TaaS are run continuously on a preset or configured frequency to ensure the above-mentioned types of testing of the specific cell sites are in compliance with the O-RAN standards continuously.

As shown FIG. 2, the cell sites 202a and 202b are connected, via the transport layer 206, to a data center 204 configured to host one or more CUs, and one or more UPFs (user plane functions) implementing at least one user plane layer, and/or any other components. In one embodiment, the data center 204 is referred to as a breakout edge data center (BEDC). In general, the data center 204 is configured to accommodate the distributed nature of various functions in the example system architecture 200 of a 5G O-RAN. In that embodiment, the BEDC hosts various 5G network functions (NFs) that have low latency requirement. In that embodiment, the BEDC provides internet peering for general 5G service and enterprise customer-specific private network service.

Shown in this example is a storage 2042 configured to store various (Cloud-native Network Functions) CNFs and artifacts for facilitating implementations of the DUs and CUs in the example system architecture 200 of the 5G O-RAN. Examples of the storage 2042 can include Amazon S3, GitHub, Harbor and/or any other storage services.

In some embodiments, such as shown in FIG. 2, the data center 204 can include one or more Kubernetes (also known as K8S) configured to facilitate automation of deployment, scaling, and management of various software/applications deployed within the data center 204 and/or within one or more cell sites operatively communicating with the data center 204 through the transport layer 206.

5G Core 208 can be implemented such that it is physically distributed across data centers or located at a central national data center (NDC) and/or regional data center (RDC). In this example, 5G core 208 performs various core functions of the 5G network. In implementations, 5G core 208 can include an O-RAN core implementing various 5G services and/or functions such as: network resource management components; policy management components; subscriber management components; packet control components; and/or any other 5G functions or services. Individual components may communicate on a bus, thus allowing various components of 5G core 208 to communicate with each other directly. Implementations 5G core 208 can involve additional other components.

Network resource management components can include: Network Repository Function (NRF) and Network Slice Selection Function (NSSF). NRF can allow 5G network functions (NFs) to register and discover each other via a standards-based application programming interface (API). NSSF can be used by AMF to assist with the selection of a network slice that will serve a particular UE.

Policy management components can include: Charging Function (CHF) and Policy Control Function (PCF). CHF allows charging services to be offered to authorized network functions. A converged online and offline charging can be supported. PCF allows for policy control functions and the related 5G signaling interfaces to be supported.

Subscriber management components can include: Unified Data Management (UDM) and Authentication Server Function (AUSF). UDM can allow for generation of authentication vectors, user identification handling, NF registration management, and retrieval of UE individual subscription data for slice selection. AUSF performs authentication with UE.

Packet control components can include: Access and Mobility Management Function (AMF) and Session Management Function (SMF). AMF can receive connection and session related information from UE and is responsible for handling connection and mobility management tasks. SMF is responsible for interacting with the decoupled data plane, creating updating and removing Protocol Data Unit (PDU) sessions, and managing session context with the User Plane Function (UPF).

In one O-RAN implementation, DUs, CUs, 5G core 208 and/or any other components in that O-RAN, is implemented virtually as software being executed by general-purpose computing equipment, such as those in one or more data centers. Therefore, depending on needs, the functionality of a DU, CU, and/or 5G 208 core may be implemented locally to each other and/or specific functions of any given component can be performed by physically separated server systems (e.g., at different server farms). For example, some functions of a CU may be located at a same server facility as where the DU is executed, while other functions are executed at a separate server system. In some embodiments, DUs may be partially or fully added to cloud-based cellular network components. Such cloud-based cellular network components may be executed as specialized software executed by underlying general-purpose computer servers. Cloud-based cellular network components may be executed on a third-party cloud-based computing platform. For instance, a separate entity that provides a cloud-based computing platform may have the ability to devote additional hardware resources to cloud-based cellular network components or implement additional instances of such components when requested.

In implementations, Kubernetes (K8S), or some other container orchestration platform, can be used to create and destroy the logical DU, CU, 5G core units and subunits as needed for the O-RAN to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU is no longer needed, Kubernetes can allow for removal of the logical DU. Kubernetes can also be used to control the flow of data (e.g., messages) and inject a flow of data to various components. This arrangement can allow for the modification of nominal behavior of various layers.

In implementations, the deployment, scaling, and management of such virtualized components can be managed by an orchestrator (such as Kubernetes) in the 5G core 208. The orchestrator can trigger various software processes executed by underlying computer hardware. In implementations, the one or more management functions (managing the 5G core 208, and/or the example system architecture 200 in general) can be implemented in the 5G core 208, for example through a M-Plane. The M-Plane can be configured to facilitate monitoring of O-RAN and determining the amount and location at which cellular network functions should be deployed to meet or attempt to meet service level agreements (SLAs) across slices of the cellular network.

In various implementations, the orchestrator can allow for the instantiation of new cloud-based components of the example system architecture 200 of the 5G O-RAN. As an example, to instantiate a new DU, the orchestrator can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

In some implementations, a network slice functions as a virtual network operating on example system architecture 200 of the 5G O-RAN. In those implementations, example system architecture 200 of the 5G O-RAN is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at a given RU and a given DU, a second set of network slices, which may only partially overlap or may be wholly different than the first set, may be reserved at the given RU and the given DU.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

In some embodiments, the 5G core 208 implements a O-RAN ZTP (zero touch provisioning) layer. In general, in those embodiments, the O-RAN ZTP layer is configured to facilitate automation of the deployment workflow within the example system architecture 200 of the 5G O-RAN. ZTP is commonly known as automated deployment of software (new or updates) to various components in a system with as little human intervention as possible. In the context of example system architecture 200 of the 5G O-RAN, ZTP means automated deployment of software (new or updates) to hardware and/or software components such as RUs, CSRs, DUs, CUs, and various modules in the 5G core 208 with little human intervention. For example without an engineer having to be present at a specific cell site such as 202a or 202b, O-RAN ZTP can facilitate automatic update of a DU with the latest DU software. It should be understood the O-RAN ZTP layer is referred to a set of components that work together to facilitate automatic deployment of software in the example system architecture 200 of the 5G O-RAN with little human intervention. Thus, although, the O-RAN ZTP layer is shown being implemented in the 5G core 208 in FIG. 2, it is merely illustrative. That is, the O-RAN ZTP in accordance with the present disclosure is not intended to be limited to components implemented a core of the O-RAN in accordance with the present disclosure. In some other examples, one or more components of the O-RAN ZTP can be implemented in, for example, CUs or DUs in the O-RAN in accordance with the present disclosure. For instance, as will be described below, adaptors configured to communicate with devices or components of different vendors for ZTP operations can be implemented in CUs or DUs.

Also shown in FIG. 2 is a NOC 210 (Network Operation Center). In some embodiments, the NOC 210 is implemented on a general-purpose computing device. In those embodiments, one or more interfaces are implemented in the NOC 210. In those embodiments, the interfaces represent virtual dashboards that can facilitate automatic deployment of software to various components in the example system architecture 200 of the 5G O-RAN. For instance, an interface is provided in the NOC 210 to enable an operator to set a schedule to update one or more network services in the 5G core 208. As another illustration, an interface is provided in the NOC 210 to enable the operator to push software to a specific component in a cell site (such as 202*a* or 202*b*) or in a data center (such as 204) to configure or update the component. One or more requests can be generated by the NOC 210 to instigate the deployment of the software as scheduled or intended by the operator. The request(s) can be received by the O-RAN ZTP layer, which in turn can generate one or more commands to deploy the software to the component. Although one NOC 210 is shown in this example, this is not intended to be limiting. More than one NOCs are typically deployed in the example system architecture 200 of the 5G O-RAN. In some implementations, a given NOC may be provided by a vendor to the 5G O-RAN. For instance, the vendor may be a software develop that provides components or services to the example system architecture 200 of a 5G O-RAN. In that instance, the given NOC is a computing device or system on a premise of the software developer.

Components such as DUs, CUs, the orchestrator, O-RAN ZTP layer, interfaces in the NOC 210, and/or any other components in the 5G core 208 may include various software components communicating with each other, handling large volumes of data traffic, and be able to properly respond to changes in the network. In order to ensure not only the functionality and interoperability of such components, but also the ability to respond to changing network conditions and the ability to meet or perform above vendor specifications, significant testing must be performed.

Example ZTP Workflow System

Figure 3:
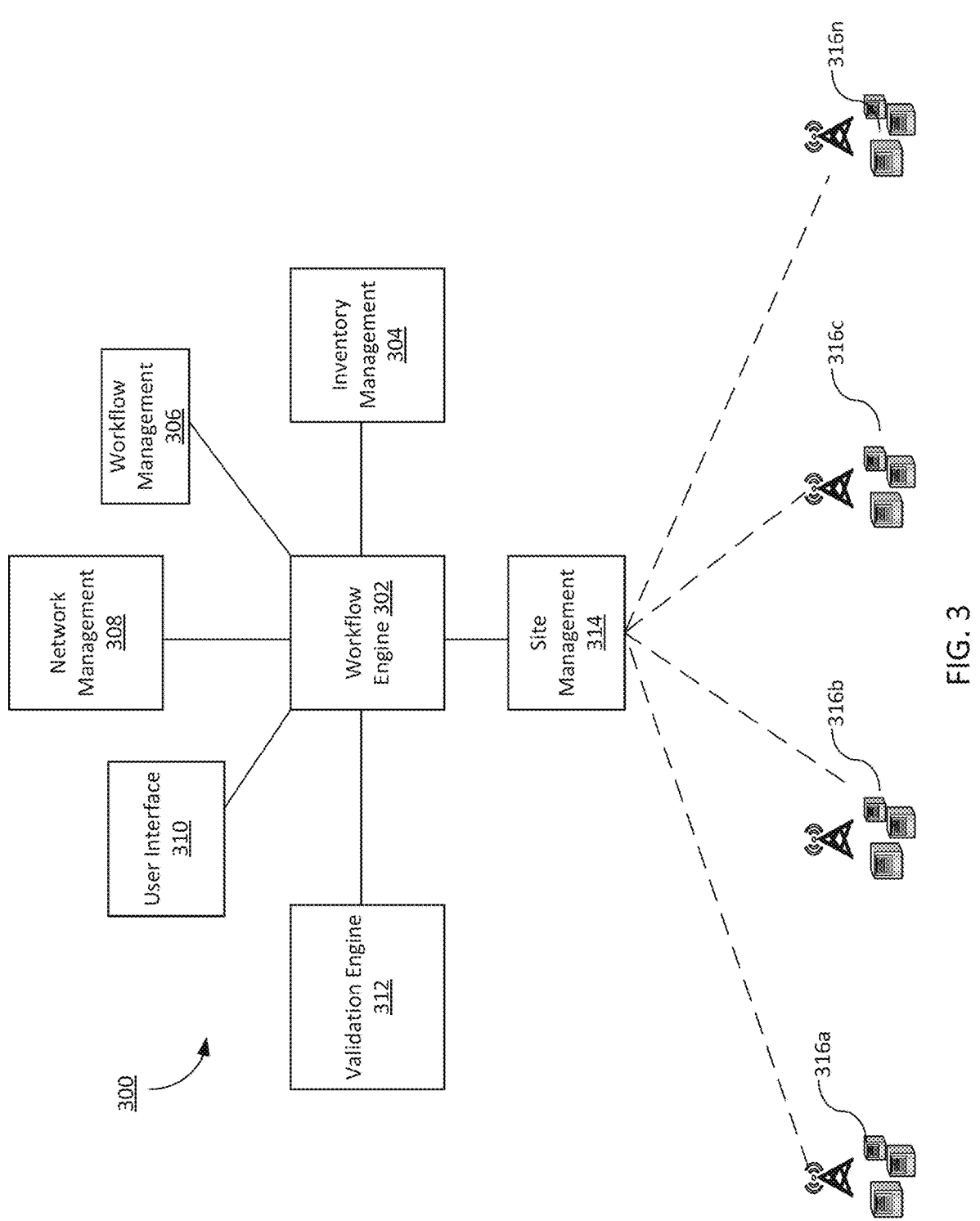
FIG. 3 illustrates an example system 300 that can facilitate for ZTP operations within a telecommunication network.

FIG. 3 illustrates an example system 300 that can facilitate for ZTP operations within a telecommunication network, such as the one shown in FIG. 1 or FIG. 2, in accordance with some embodiments. In this example, the system 300 includes a site management component 314, an inventory management component 304, a workflow engine 302, a workflow management component 306, a network management component 308, a user interface 310, a validation engine 312, and/or any other components. As also shown, the various components in the example system 300 are operable to communicate with individual cell sites 316*a*, 316*b*, 316*c*, 316*n*.

In various embodiments, the site management component 314 is configured to manage hardware and/or software deployed at each individual cell site, for example 316*a*, 316*b*, 316*c*, 316*n*. In some embodiments, the site management component 314 is configured to configure hardware on individual cell sites according to instructions provided to the site management component 314. In some embodiments, the site management component 314 is configured to boot strap network devices, upgrade network operating system (NOS), and configure VLANS across the individual cell sites. In some embodiments, the site management component 314 is configured to connect servers or hosts via selected network topology across the individual cell sites. In some embodiments, the site management component 314 is configured to deploy virtual infrastructure management (VIM) into a workload-ready state. In some embodiments, the site management component 314 comprises a bare metal orchestrator (BMO) provided by Dell.

In various embodiments, the site management component 314 is configured to manage and/or distribute workloads and/or data to individual cell sites. In some embodiments, the site management component 314 is configured to onboard, view, and manage a virtual infrastructure across the individual cell sites. In some embodiments, the site management component 314 comprises Telco Cloud Automation (TCA) orchestrator provided by VMWare.

In various embodiments, the inventory management component 304 is configured to facilitate dynamic network inventory for one or more networks provided by the individual cell sites. In some embodiments, the inventory management component 304 provides a comprehensive, end-to-end view of the resources to plan the deployment of new infrastructure for the individual cell sites and as well as to manage capacity. This facilitates delivering dynamic services like 5G, including network slicing. In some embodiments, the inventory management component 304 is configured to provide a unified, dynamic view of hybrid resources and services across multiple domains to streamline operations and reduce complexity. In those embodiments, the inventory management component 304 provides auto-discovery and federation capabilities using graph database technology to model and visualize complex, dynamic networks, enabling automated workflows, such as the ZTPO workflows. In some embodiments, the inventory management component 304 comprises a Blue Planet Inventory (BPI) system provided by Blueplanet.

In various embodiments, the workflow engine 302 is configured to facilitate ZTP operations to be carried out across the cell sites and/or on a core network. The workflow may involve automating one or more jobs to set up and/or verify one or more components on the core network to be ready for deploying network functionalities on the core network. The workflow may involve setting up one or more servers on the core network and/or in the individual cell sites for cell site deployment. The workflow may involve pushing software to update one or more components in the cell sites, and/or any other operations. In various embodiments, the workflow engine 302 comprises a Cisco Business Process Automation Service (BPA).

In various embodiments, the workflow management component 306 is configured to manage one or more workflow to be carried out by the workflow engine 302. The workflow management by the workflow management component 306 may involve managing a work flow for configuring one or more servers on the core network, one or more distributed units (DU) in the core network, one or more radio access network (RAN) in the individual cell sites, one or more virtual clusters in the core network, one or more network functions in the core network, and/or any other work flows.

In various embodiments, the network management component 306 is configured to manage one or more network components and/or devices on a core network. The network management may involve managing and identifying devices connected to the core network—for example, for the Domain Name System (DNS), Dynamic Host Configuration Protocol (DHCP), IP address management (collectively, "DDI"), and/or any other services. The network management may involve reserving and/or assigning one or more internet/intranet addresses for one or more components in the core network and/or individual cell sites. In various embodiments, the network management component comprises a system provided by Infoblox.

In various embodiments, the user interface 310 is provided to facilitate a user to monitor a progress of the ZTP operations facilitated by the workflow engine 302, verify one or more results of the workflow managed by the workflow management component 306, check one or more statuses of individual cell sites, check a status of a network function on the core network, and/or any other services. In various embodiments, the user interface 310 includes a graphical user interface (GUI) depicting a success/failure of a ZTP operation or workflow carried out to an individual cell sites, and/or whether or there is an issue with the ZTP operation and/or the workflow.

The validation engine 312 is configured to perform one or more validation tasks for the ZTP operations facilitated by the workflow engine 302. The validation may involve validating whether one or more servers are ready on the core network for deploying individual cell sites, validating whether one or more DU/RAN are deployable before their deployment and/or whether they are ready after their deployment.

Example RU/DU/CU Chaining in O-RAN

With the example system 300 having been generally described, attention is now directed to FIG. 4, where examples of RU/DU/CU chaining in O-RAN in accordance with the present disclosure are provided. As mentioned, in O-RAN in accordance with the present disclosure, CUs are typically implemented in one or more clouds to implement network functions. CUs are typically instantiated to provide network functions for the O-RAN. CU typically runs the RRC and PDCP layers.

In O-RAN architecture, a DU is typically responsible for real time L1 and L2 scheduling functions, and a CU is typically responsible for non-real time, higher L2 and L3. For example, in a 5G cloud RAN, the DU's server and relevant software could be hosted on a site itself or can be hosted in an edge cloud (datacenter or central office) depending on transport availability and fronthaul interface. The CU's server and relevant software can be co-located with the DU or hosted in a regional cloud data center.

In O-RAN, a gNB typically comprises a CU and one or more DUs connected to the CU via Fs-C and Fs-U interfaces for CP and UP respectively. In some examples, A CU with multiple DUs may provide multiple gNBs for the O-RAN. This split architecture enables an O-RAN network to utilize different distribution of protocol stacks between CU and DUs depending on mid-haul availability and network design. In O-RAN, gNB is a logical node that includes the functions like transfer of user data, mobility control, RAN sharing (MORAN), positioning, session management etc., with the exception of functions that are allocated exclusively to the DU. A CU may control the operation of several DUs over the mid-haul interface.

In O-RAN, RU is typically a physical radio unit that handles digital front end (DFE) and the parts of the PHY layer, as well as the digital beamforming functionality. The actual split between DU and RU may be different depending on the specific use-case and implementation. In various examples, a DU may be collocated with one or more RUs on-site to conduct intense processing tasks such as fast Fourier transform/inverse fast Fourier transform (FFT/IFFT). This ddge-centric baseband processing delivers low latency, local breakout, seamless mobility with real-time interference management, and optimal resource optimization. In O-RAN, the lower level interface that connects RU and DU (fronthaul) may be eCPRI that delivers lowe latency. In some examples, fronthaul latency is less than 100 microseconds. In various examples, a single DU may be in a same cell site with one or more RUs also in that cell site. In those examples, once the DU is instantiated in the O-RAN, it can be connected with those RUs. In some examples, the DU may be located remote relative to the RUs, for example many miles away. In those examples, the DU may be connected with RUs across different cell sites.

FIG. 4 illustrates various examples of RU/DU/CU chaining in an O-RAN in accordance with the present disclosure. As shown, in some examples, the RUs and DUs are co-located in a same cell site, such as cell site 402a and 402b in FIG. 4. For instance, one DU in a cell site is chained with one or more RUs also located in the same cell site. However, this is not necessarily the only scenario. As shown, in some examples, RUs in a same cell site may be chained with a DU remote to the that cell site, such as the cell site 402c and 402d. In FIG. 4, the RUs in cell site 402c are chained with a DU 404a located near an edge of the O-RAN, for example in a data center proximate to the cell site 402c. However, this is also not necessarily the only case. In some examples, the RUs in a same cell site, such as the cell site 402d, are chained with a DU located at far edge of the O-RAN. For instance, the DU 404b in this example may be located in a data center where many other DUs are provided. In that instance, the data center may be a regional data center hosting O-RAN for cell sites located in that region. In some examples, RUs from different cell sites may be chained with one DU. In those examples, such a chaining may be referred to a cross-site chaining of RUs and DU.

As shown, DUs are chained with CUs as mentioned above. As also mentioned, one CU may be chained one single DU or multiple DUs to provide functionalities of gNBs. In various examples, once a CU is instantiated in the O-RAN, one or more DUs (already instantiated) may be chained with that CU. In various examples, once a DU is instantiated in the O-RAN, a CU (already instantiated) may be chained with that DU.

Figure 5:
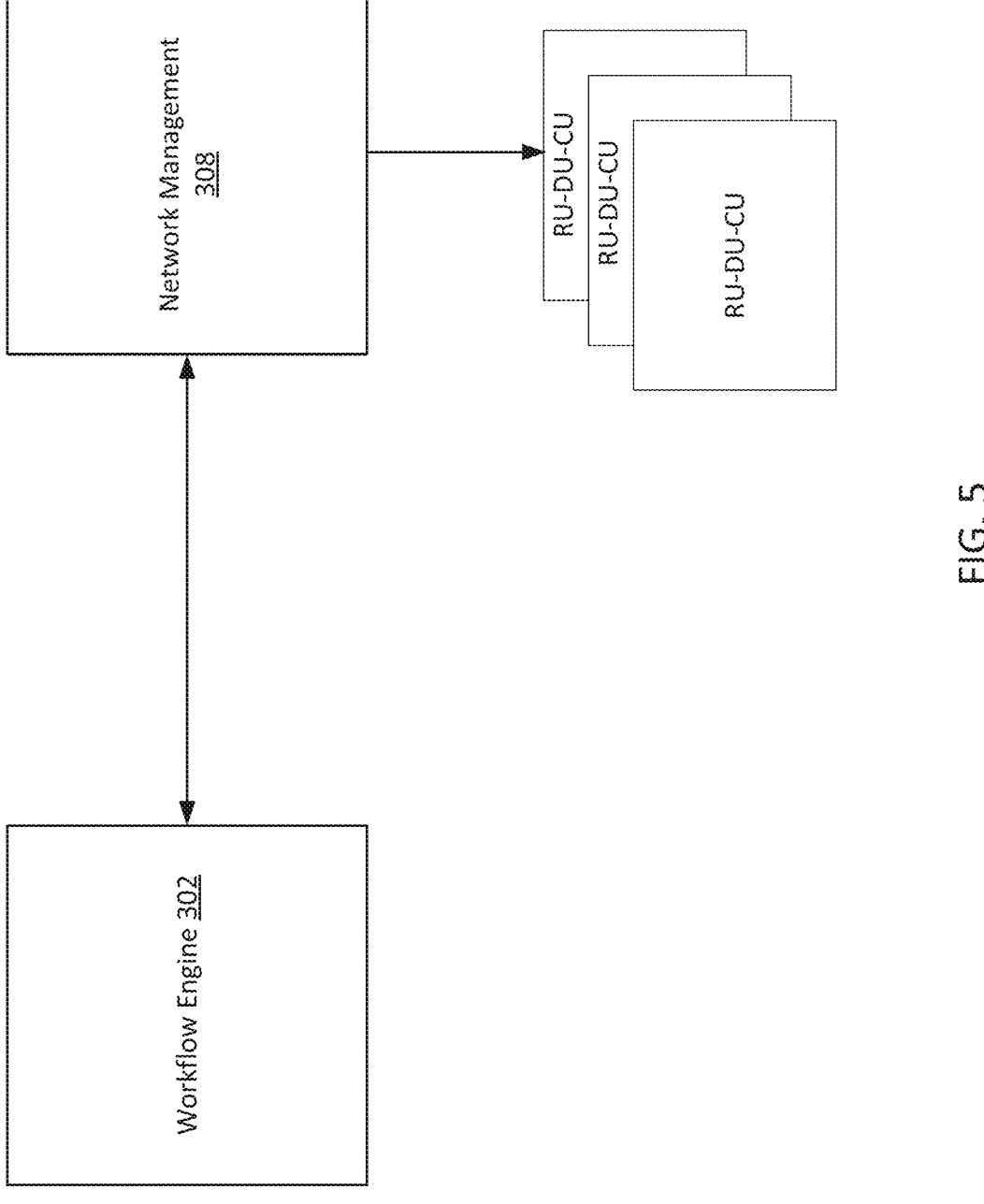
FIG. 5 illustrates one example of facilitating RU-DU-CU chaining in accordance with the present disclosure.

FIG. 5 illustrates one example of facilitating RU-DU-CU chaining in accordance with the present disclosure. In this example, the inventory management system 304 shown in FIG. 3 is configured to communicate with the network management system 308. In this example, the network management system 308 stores and manages information regarding configurations of the O-RAN. In some instances, the network management system 308 employs an element management system (EMS) for managing configuration information for the O-RAN. As mentioned, the configuration information can include RU-DU-CU chaining information, such as the chaining shown in FIG. 4.

In some example implementations, ZTP operations are configured such that instances of CUs and/or DUs are monitored by the network management system 308. In those implementations, when a CU is instantiated, the network management system 308 informs the workflow engine 302 that the CU is instantiated. The workflow engine 302 then starts a corresponding DU-CU ZTPO procedure to chain one or more DUs to the instantiated CU. The ZTPO procedure may involve getting information from the network management system 308 regarding the DU-CU chaining. For instance, as mentioned, the network management system 308 may include an EMS, which comprises chaining information as to which DU(s) may be chained with the instantiated CU. The ZTPO procedure is configured to chain the DU(s) with the instantiated CU according to the chaining information.

Similarly, when a DU is instantiated, the network management system 308 is configured to report it to the workflow engine 302, which starts corresponding ZTPO procedure to chain the DU to a corresponding CU. In some implementations, ZTPO procedure involves consulting the network management system 308 for DU-CU chaining and chains the DU accordingly.

Figure 6:
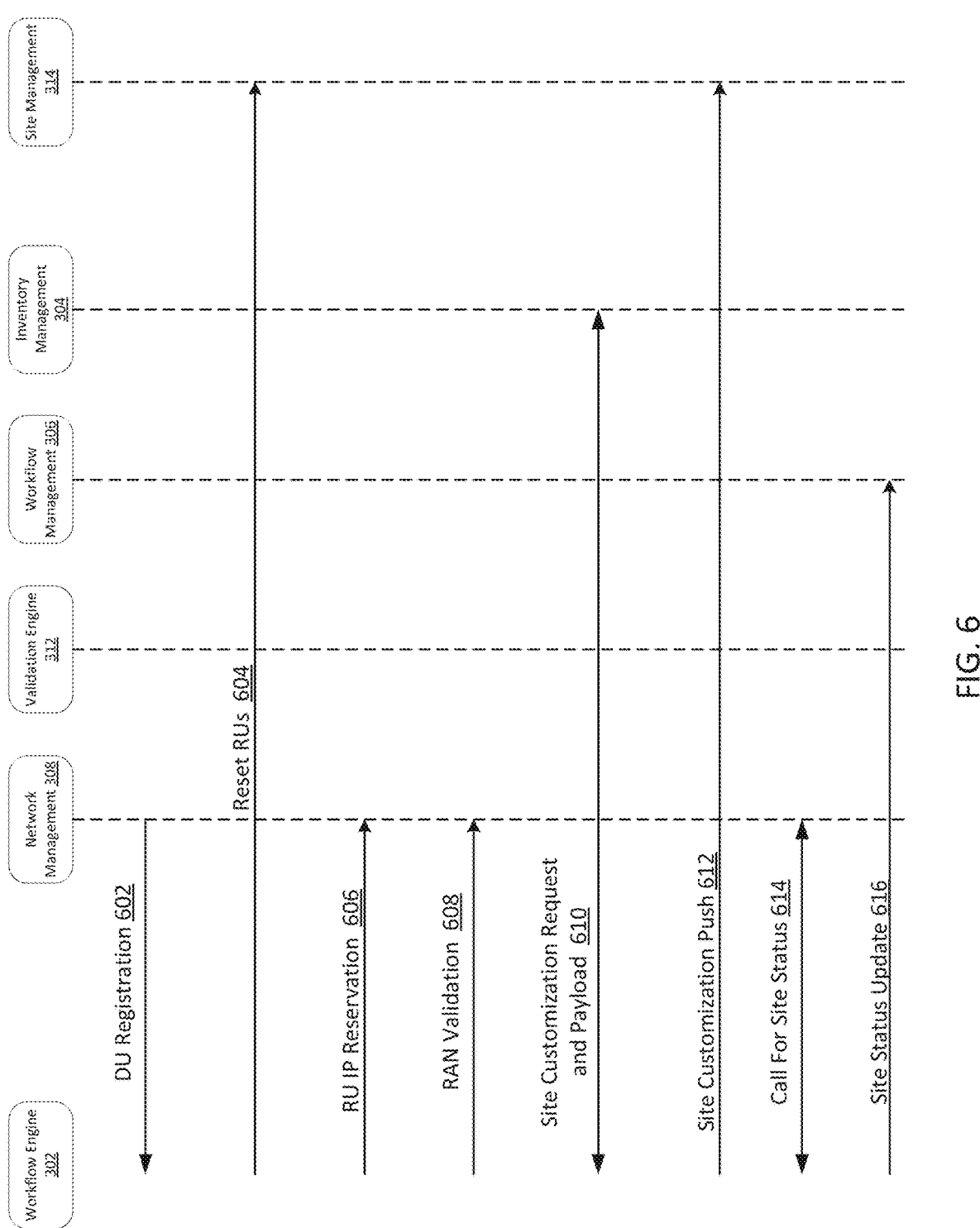
FIG. 6 illustrates one example method of RU-DU chaining in accordance with the present disclosure.

FIG. 6 illustrates one example method of RU-DU chaining in accordance with the present disclosure. It will be described with reference to FIG. 3. As shown, at 602, the network management system 308 detects that a DU is instantiated in the O-RAN. The network management system 308 is configured to, in this example, transmit a registration message to the workflow engine 302. In this example, the network management system 308 sends DU-RU chaining information to the workflow engine 302 along with the DU registration message.

At 604, as part of the ZTPO procedure, the workflow engine 302 generates a request to reset one or more RUs to be chained with the DU according to the request received at 602. The workflow engine 302 sends the request to the site management system 314, which then generates and executes one or more instructions to reset the RU(s) accordingly.

At 606, as part of the ZTPO procedure, the workflow engine 302 sends a request to the network management system 308 to reserve one or more IP addresses for the RU(s) reset at 604 This is to facilitate the RU(s) to be reachable in the O-RAN. The one or more IP addresses are used to chain the DU with the RU(s).

At 608, as part of the ZTPO procedure, the workflow engine 302 triggers the validation engine 312 to initiate validation procedure to verify if individual RAN(s) associated with the RU(s) chained with the DU.

At 610, site customization is obtained from the inventory management system 304. chAt 612, customization for individual cell sites is transmitted to the site management system 314 for the site management system 314 to execute. At 614, status of the individual cell site customization and set up is requested from the network management system 308. At 616, the site status is recorded and/or updated in the workflow management system 306.

Example Computer System

Figure 7:
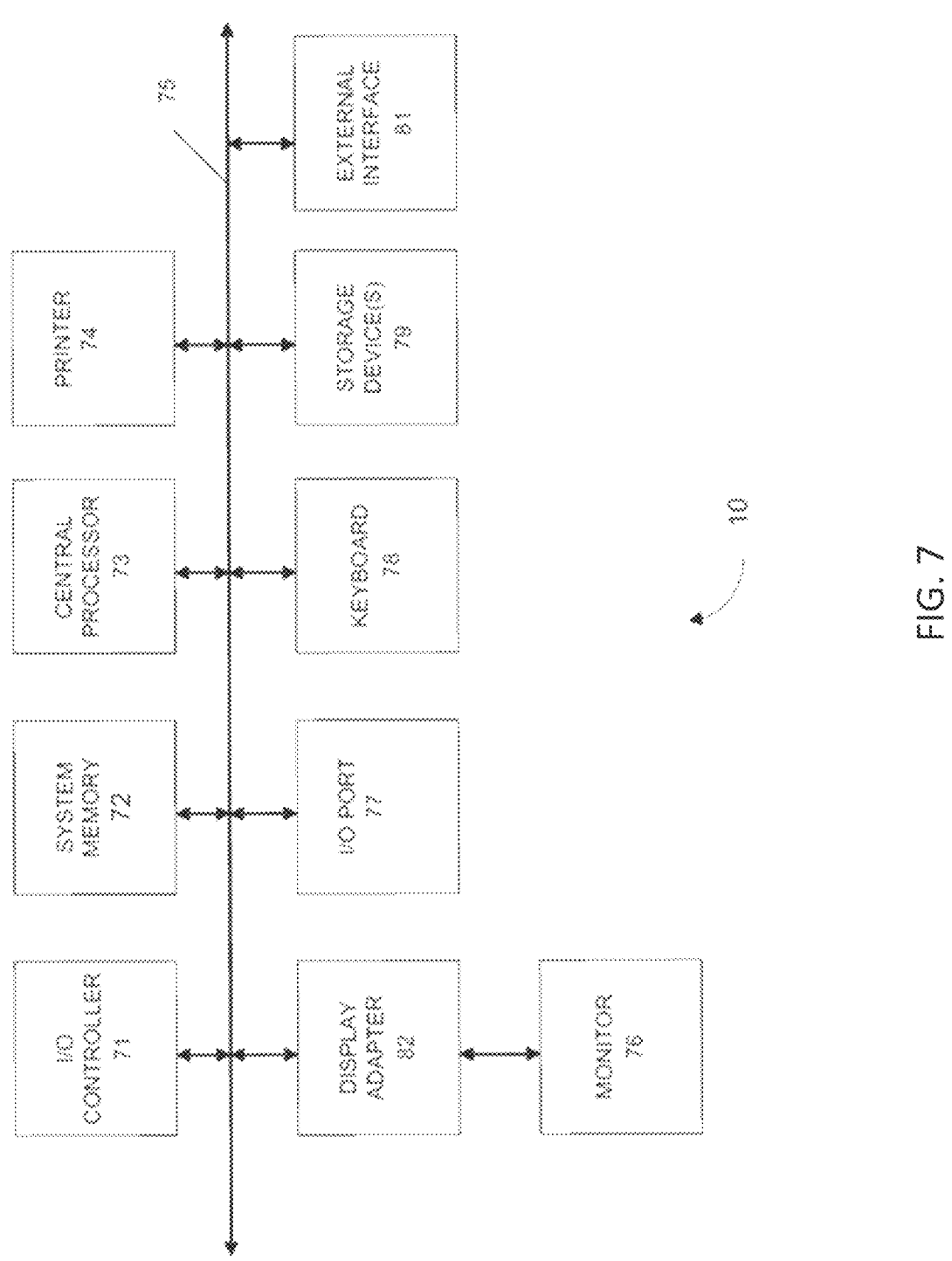
FIG. 7 generally illustrates an example of a computer system that can be used to implement various embodiments.

Any of the computer systems and embodiments mentioned herein may be implemented by or utilize any suitable number of subsystems. Examples of such subsystems are shown in FIG. 7 in computer system 10, which can be configured to implement various features and/or functions described herein. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 7 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method for chaining a radio unit and distribution unit automatically in an open radio access network (O-RAN), the method being implemented by a computer system, wherein the method comprises:
   detecting a distribution unit (DU) is instantiated in the O-RAN;
   obtaining chaining information for the DU, the chaining information indicating a chaining between the DU and at least one radio unit (RU);
   resetting the at least one RU;
   chaining the DU with a central unit (CU), wherein the CU is configured for non-real time scheduling functions and the DU is configured for real time scheduling functions; and
   chaining the DU with the at least one RU to form a radio access network (RAN) for a cell site.

2. The method of claim 1, wherein the method further comprises:
   reserving one or more network addresses for the at least one RU; and, wherein the chaining of the DU with the at least one RU uses the one or more network addresses.

3. The method of claim 1, wherein the method further comprises validating the RAN to verify the RAN is accessible.

4. The method of claim 1, wherein the method further comprises performing customization for the cell site after the RAN is accessible.

5. The method of claim 1, wherein the RU and the DU are both physically located on the cell site.

6. The method of claim 1, wherein the RU is physically located on the cell site and the DU is physically located remoted to the cell site.

7. The method of claim 1, wherein chaining the DU with the CU comprises: detecting the CU is instantiated and obtaining information indicating the CU is to be chained with the DU.

8. The method of claim 1, wherein the RU, DU and CU form a gnodeB (gNb).

9. A computer system configured to execute a method for chaining a radio unit and distribution unit automatically in an open radio access network (O-RAN), wherein when the method is executed, the computer system is caused to perform:
   detecting a distribution unit (DU) is instantiated in the O-RAN;
   obtaining chaining information for the DU, the chaining information indicating a chaining between the DU and at least one radio unit (RU);
   resetting the at least one RU;
   chaining the DU with a central unit (CU), wherein the CU is configured for non-real time scheduling functions and the DU is configured for real time scheduling functions; and
   chaining the DU with the at least one RU to form a radio access network (RAN) for a cell site.

10. The computer system of claim 9, wherein the computer system is further caused to perform:
   reserving one or more network addresses for the at least one RU; and, wherein the chaining of the DU with the at least one RU uses the one or more network addresses.

11. The computer system of claim 9, wherein the computer system is further caused to perform:
   validating the RAN to verify the RAN is accessible.

12. The computer system of claim 9, wherein the computer system is further caused to perform customization for the cell site after the RAN is accessible.

13. The computer system of claim 9, wherein the RU and the DU are both physically located on the cell site.

14. The computer system of claim 9, wherein the RU is physically located on the cell site and the DU is physically located remoted to the cell site.

15. The computer system of claim 9, wherein chaining the DU with the CU comprises: detecting the CU is instantiated and obtaining information indicating the CU is to be chained with the DU.

16. The computer system of claim 9, wherein the RU, DU and CU form a gnodeB (gNb).

* * * * *